Figure 1:
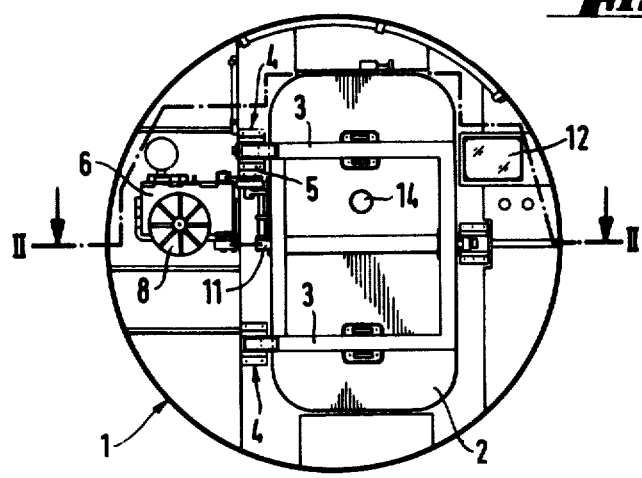

United States Patent [19]

Soininen et al.

[11] 4,376,352
[45] Mar. 15, 1983

[54] PERSONNEL AIR LOCK

[75] Inventors: Pentti Soininen, Vantaa; Olle Henrichson, Helsinki, both of Finland

[73] Assignee: Oy Wartsila Ab, Helsinki, Finland

[21] Appl. No.: 117,244

[22] Filed: Jan. 31, 1980

[30] Foreign Application Priority Data

Feb. 2, 1979 [FI] Finland .................................. 790346

[51] Int. Cl.³ .............................................. E06B 7/00
[52] U.S. Cl. ........................................................ 49/68
[58] Field of Search ................. 49/68, 103, 104, 107; 405/192

[56] References Cited

U.S. PATENT DOCUMENTS

| 2,926,012 | 2/1960 | Maher | 49/68 |
| 2,927,787 | 3/1960 | Maher | 49/68 X |
| 3,745,955 | 7/1973 | Devine | 49/68 X |

FOREIGN PATENT DOCUMENTS 1577516  6/1969  France ................................ 49/68

Primary Examiner—Philip C. Kannan
Attorney, Agent, or Firm—McAulay, Fields, Fisher, Goldstein & Nissen

[57] ABSTRACT

A closable passage arrangement interconnecting two spaces and comprising a closure unit having two passage openings each provided with a door or the like lockable with a locking bolt mechanism. Each door connects the closure unit to a different one of the two spaces. The doors are provided with driving means for their operation. The driving means comprises, for each door, a power transmission unit arranged to influence separately a mechanism for turning the door and a mechanism for operating the locking bolt mechanism of the door. The power transmission units of the doors are interconnected by means of a common shaft. The power transmission units include a pin-and-fork mechanism, wherein a rotatable power transmission member provided with crank pins or the like cooperates with a number of fork members. The driving means comprises a plurality of door operating stations each including a door operating member being directly or by means of the common shaft connected to the power transmission units. The driving means includes mechanical means positively guiding the functions of the driving means during opening and closing of any of said doors and means mechanically guiding these functions to take part only in one given order. The functions are obtainable from any of said door operating stations, whereby, when operating one door, the operating mechanisms of the other door is mechanically locked in its closed position.

6 Claims, 8 Drawing Figures

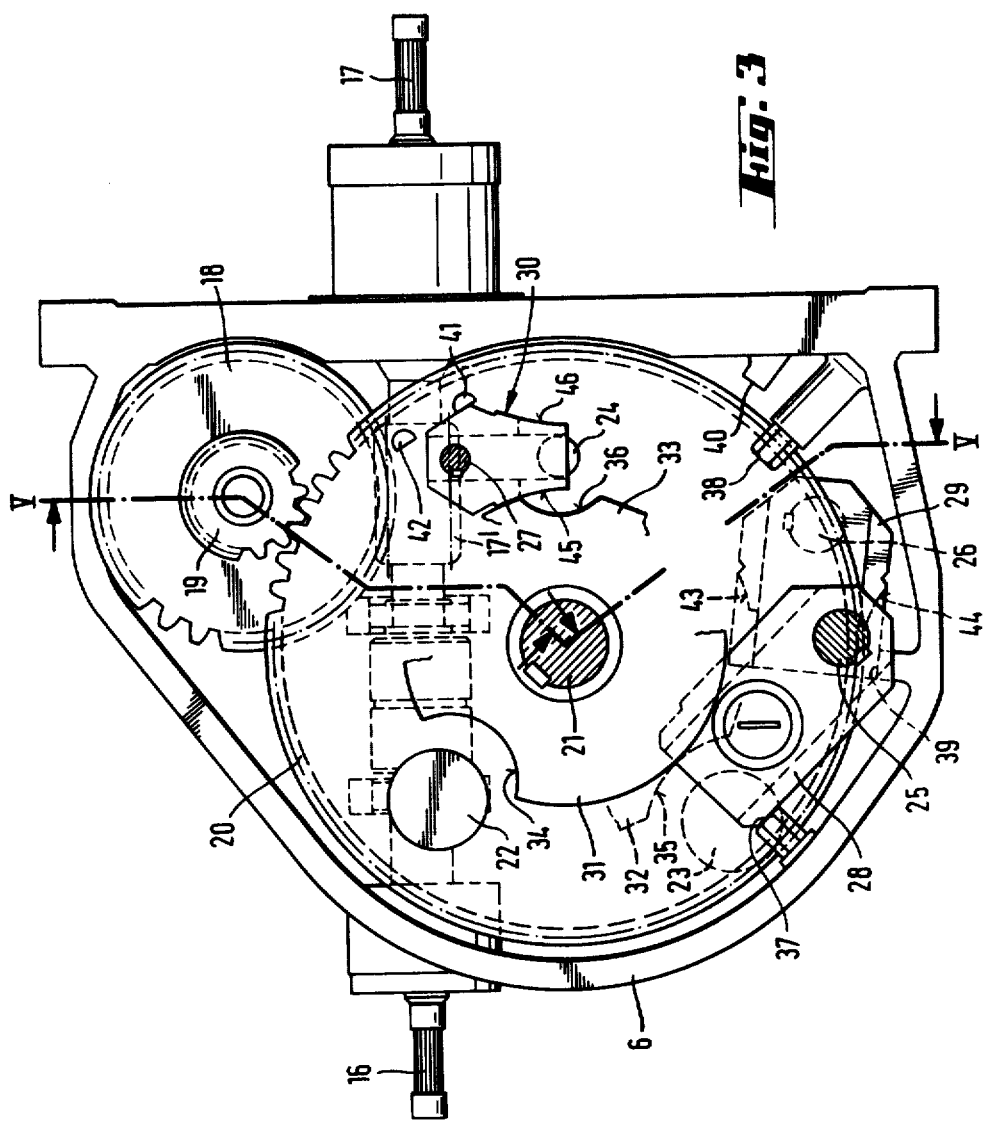

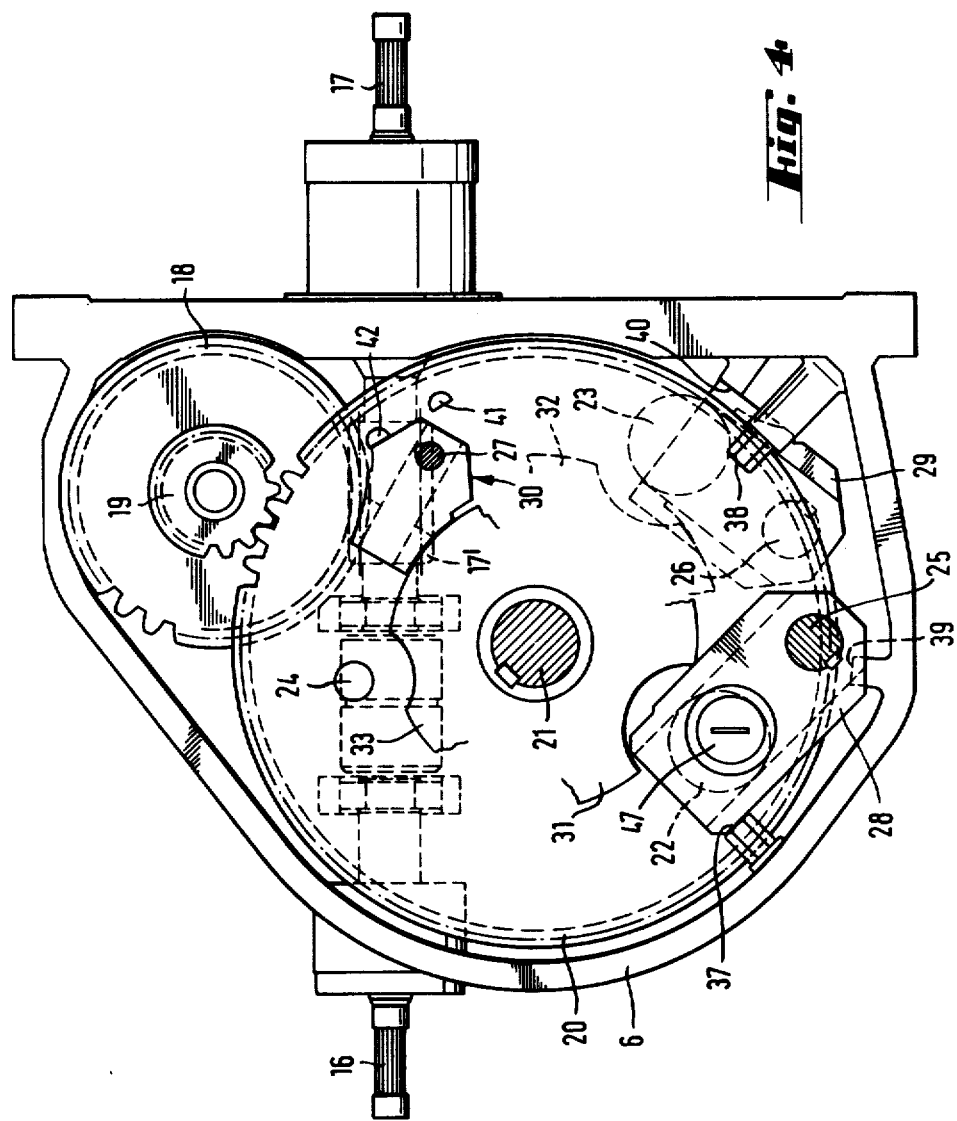

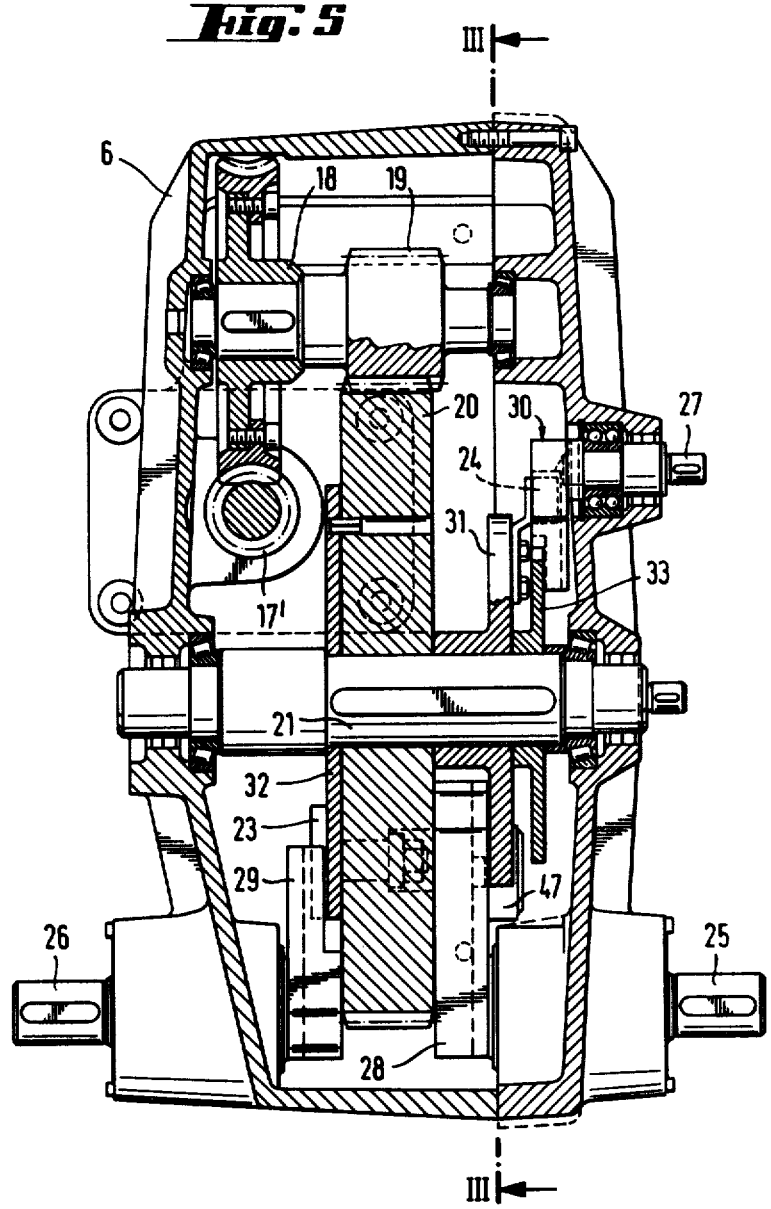

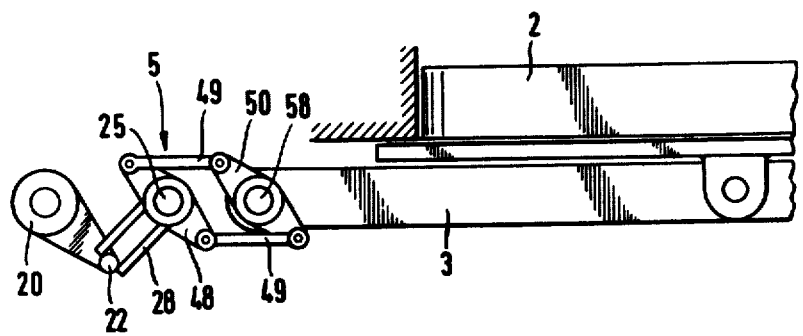
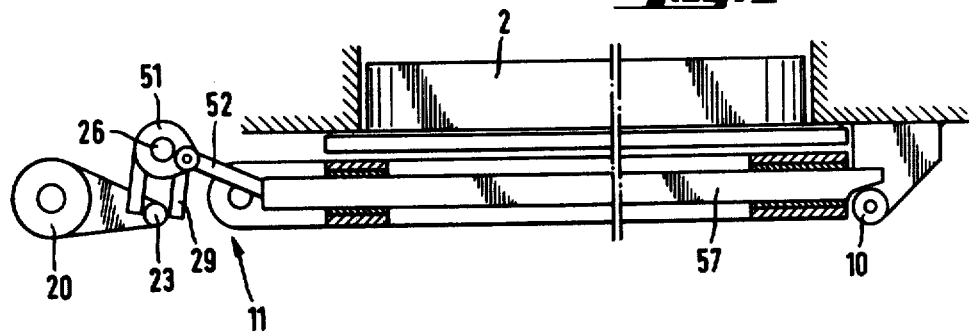
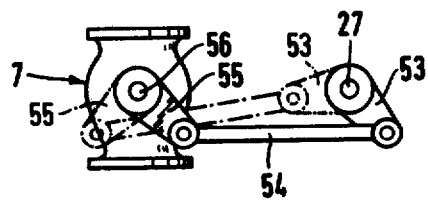

PERSONNEL AIR LOCK

The invention relates to a closing arrangement for a passage connecting to spaces which are to be kept isolated from each other, which arrangement comprises a closure unit in connection with said spaces, which unit has two passage openings provided each with a door lockable with a locking bolt mechanism, each door connecting said closure unit with one of said spaces, a driving means for said doors and pressure balancing means including a pressure balancing valve for balancing the pressure between the closure unit and said spaces, said driving means comprising, for each door, a power transmission unit arranged to influence separately a mechanism for turning the door and a mechanism for operating the locking bolt mechanism of the door.

Personnel air locks are used in different applications. A demanding application is the arrangement of the personnel traffic between the inside and outside of the containment of the reactor building of a nuclear power plant during the use of the plant. In emergency cases the air lock must be able to guarantee safe escape from the reactor building. Due to far-going requirements with respect to the safety and functional reliability of such an air lock, known air locks have been very complicated and thus also expensive. In spite of this it has not been possible to eliminate to a sufficient degree the possibilities of faulty operation of the air lock.

The object of the invention is to provide a personnel air lock in which the drawbacks occuring in known constructions have been eliminated and in which particular attention have been paid to its functional reliability, its uncomplicated operation, its safety and the elimination of the possibilities of faulty operation. The invention is characterized in that the power transmission units of the doors, in a way known per se, are interconnected by means of a common shaft, that the power transmission of the power transmission units is arranged by using a pin-and-fork mechanism or the like, whereby the power transmission unit comprises a rotatable power transmission member provided with crank pins or the like, and that said driving means comprises a plurality of operating members at different door operating stations being directly or by means of said common shaft connected to said power transmission units, which operating members are mechanically so arranged, that the functions provided by the driving means in connection with the opening or closing of one of said doors are carried out by means of positive mechanical guiding and always in the same order, and that said functions can be carried out from any of said door operating stations, whereby when operating one door, the operating mechanism of the other door is mechanically locked in its closed position. This closing arrangement construction makes it possible to obtain an uncomplicated and reliable function. Since the power transmission units of the doors are interconnected with a common shaft, both doors can be operated from all operating stations. Since, on the other hand, it is possible to operate the function mechanism of only one door at a time, there will be no mutual contradiction between the functions of the driving means. It should be noted that "closed position" means that position of the elements and the mechanisms which corresponds to the closing position of the door, of the locking bolt mechanism and of other operable units. In addition, the term door should be given a broad interpretation including also closable scuttles or the like.

The functions of the driving means when opening any of the doors are arranged to take part in the following order: pressure balancing by opening the pressure balance valve, opening of the locking bolt mechanism, turning the door open by means of its turning mechanism, and correspondingly, when closing any of the doors; closing of the door by means of the turning mechanism, closing of the locking bolt mechanism, closing of the pressure balance valve.

In a preferred embodiment of the invention said driving means comprise, for each power transmission unit, drive shaft for each function of the arrangement. These drive shafts are provided with fork guides to be influenced by said crank pins or the like for obtaining the functions of the closing arrangement. In this way each function of the driving means includes its own pin-and-fork mechanism in each power transmission unit.

For keeping said fork guides in their closed position the rotatable power transmission member can be provided with guiding discs which prevent said fork guides from moving away from their closed position. In order to improve the security and in order to arrange proper lubrication it is of advantage to surround said rotatable power transmission member with a housing. This housing can be provided with fixed guiding surfaces for limiting the freedom of turning of said fork guides. By these means the fork guides will be mechanically guided in their driving position as well as in their idle position, which improves the reliability of the driving means and effectively eliminates the possibilities of faulty operation.

Since said power transmission units are interconnected by means of a shaft, the functions of the driving means of the closure unit doors leading to different spaces should preferably be performable by means of moving a power transmitting member one full turn into opposite directions. Thus, the function range of said rotatable power transmission member can be chosen to be about 360°, within which range at least substantially equal control sections, preferably about 180°, are reserved for the functions of the driving means to be carried out at both doors of said closure unit. Thereby it is of advantage to arrange the power transmission and guiding members of said power transmission unit so that said functions to be carried out at one door of the closure unit are obtainable substantially one after another within the guiding sector reserved for these functions, when rotating said rotatable power transmission member, and that when going over to the guiding sector of the power transmission member reserved for the functions to be carried out at the other door of the closure unit, said power transmission and guiding members are mechanically locked in their closed position.

In addition to what has been stated above contradictions between the functions of the driving means can be prevented by arranging the function of said power transmission and guiding members, preferably by means of stop members, so that the functions of the driving means relating to the opening of a door can only be directly followed by the functions relating to the closing of said door.

In case some obstacle for the opening or closing movement of the door occurs, the turning mechanism of the door should preferably be provided with a mechanical overload guard, which switches off the turning mechanism of the door, when an opposing force of a certain magnitude influences the door during its opening or closing.

Figure 2:
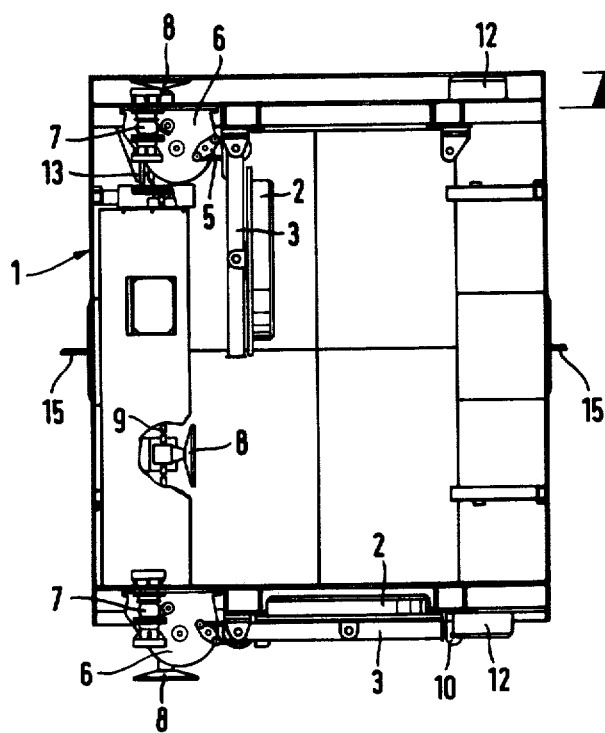

In the following, the invention will be explained more in detail with reference to the attached drawing, in which FIG. 1 shows a closure unit of a closing arrangement according to the invention seen in the passage direction, FIG. 2 shows section II—II of the closure unit of FIG. 1, FIGS. 3 and 4 show schematically the construction of a power transmission unit in different functional positions taken on section III—III of FIG. 5, FIG. 5 shows an embodiment of the power transmission unit in the form of section V—V of FIG. 3, FIG. 6 shows schematically a door turning mechanism, FIG. 7 shows schematically a door locking bolt mechanism, FIG. 8 shows schematically the driving mechanism of the pressure balance valve of the closing arrangement.

In the drawing, numeral 1 indicates a closure unit allowing passage between two spaces isolated from each other. The actual isolating means may be, for instance, the containment of a nuclear power plant to which said closure unit is attached, for instance, by means of welding as shown at 15. In particular, in dangerous applications the basic material of the unit is most favourably steel.

Closure unit 1 is at its both ends provided with a door 2, which by means of hinge beams 3 and hinges 4 is swingably attached to the shell portion of the closure unit. Both doors 2 have its own power transmission unit 6, which transmits control movements from a hand wheel 8 to a pressure balancing valve 7, to the locking bolt mechanism 11 of the door and to the turning mechanism 5 of the door. The power transmission units 6 are interconnected by means of a common shaft 9 so that it is possible to carry out said control movements from any operating station. However, the functions are due to safety precautions arranged to take part only at one door of closure unit 1 at a time. There is a locking device 10 for the locking bolt of each door of the closure unit. When required the doors can be provided with an inspection glass 14. Closure unit 1 is also provided with electric control units 12 and an electric motor 13 for controlling electrically the functions of the driving means. Thus, the control of the driving means can alternatively be carried out either mechanically by means of hand wheels 8 or electrically by means of control units 12. Naturally, control arrangements based on hydraulic or pneumatic driving means are also feasible.

The construction and the functional principles of the power transmission unit are evident from FIGS. 3, 4 and 5. Power transmission unit 6 is provided with two interconnected stub shafts 16 and 17, of which one is connected to hand wheel 8 and the other to common shaft 9. Thus stub shafts 16 and 17, which form the main shaft of power transmission unit 6, can be rotated either directly from a hand wheel 8 or by means of electric motor 13, for instance, by using a suitable clutch and a cone belt transmission. The rotary motion is transmitted by means of a worm gear 17', 18 and a gear wheel 19 further to a great gear wheel 20 attached to a shaft 21 and provided with crank pins 22, 23 and 24. In the power transmission unit there are also fork guides 28, 29 and 30 attached to stub shafts 25, 26 and 27. These fork guides together with the stub shafts are arranged to be turned by means of crank pins 22, 23 and 24, when gear wheel 20 is rotated. The guiding movements are further transmitted to turning mechanism 5 of the door by means of stub shaft 25, to the locking bolt mechanism 11 by means of stub shaft 26, and to pressure balancing valve 7 by means of stub shaft 27. Said crank pins 22, 23 and 24 and fork guides 28, 29 and 30 corresponding thereto, together with stub shafts 25, 26 and 27, are so located relative to each other, that the transmission of the control movements of each of said function mechanisms takes part substantially successively.

The freedom of turning of the fork guides is limited by means of stop surfaces 37 and 38 (for fork guide 28) 39 and 40 (for fork guide 29) and 41 and 42 (for fork guide 30). In addition, there are, in power transmission unit 6, guiding discs 31, 32 and 33, the object of which is to make sure that each fork guide remains in its proper position before and after the actual control movement. For this purpose there are guiding surfaces 43 and 44 in fork guide 29 and guiding surfaces 45 and 46 in fork guide 30. The corresponding locking of fork guide 28 driving turning mechanism 5 of the door has, differently from what is disclosed above, been arranged by means of a freely rotating guide roll 47 in order to reduce the wear caused by friction. In order to avoid that said guiding discs prevent turning of the fork guides by the crank pins, there are peripheral recesses 34, 35 and 36 in the guiding discs in question, which are located at the positions of the crank pins.

In FIGS. 6, 7, 8 there are shown schematically the drive mechanism 5 of door 2, the locking bolt mechanism 11 and the drive mechanism of pressure balancing valve 7. According to FIG. 6, a lever 48 has been attached to stub shaft 25. This lever is by means of connecting rods 49 connected to a lever 50, which in turn turns hinge beam 3 and door 2 supported thereby on shaft 58. According to FIG. 7, stub shaft 26 is connected to a lever 51 which by means of a push rod 52 moves a locking bolt 57 in its axial direction for locking and releasing the door. For controlling the function of valve 7, stub shaft 27 has, as shown in FIG. 8, been attached to a lever 53, which by means of a push rod 54 and a lever 55 turns valve spindle 56 of valve 7.

The driving means of the door is so constructed, that the functions can be carried out only at one door of the closure unit at a time. Since the power transmission units are interconnected by means of a common shaft and since the doors should be operable from any operating station (see hand wheels 8), the working sector or turning angle of gear wheel 20 provided with crank pins, is limited to 360° (in practice it is slightly smaller), so that there should be no mutual contradiction between the functions. Within this working sector of gear wheel 20 equal operating sectors, that is about 180°, have been reserved for the driving means functions to be carried out at both doors of the closure unit. This means that said fork guides are located and their turning by means of said crank pins is carried out for each door within a separate sector of 180°. When opening the door, the functions are arranged to take part in the following order: pressure balancing by opening pressure balance valve 7, opening of locking bolt mechanism 11 of the door, turning the door open by turning mechanism 5. Hence, this takes part when gear wheel 20 turns about 180°. In order to prevent the movement from thereby going over to the operating sector of the functions of the other door of the closure unit, suitable mechanisms, for instance stop faces, can be used for preventing gear wheel 20 from turning further. Thus, the opening functions can only be followed by closing functions carried out for the same door of the closure unit, but naturally in the opposite order relative to the functions listed above. All the time, the function mechanisms of the other door of the closure unit are mechanically locked in their closed position by means of the already mentioned guiding discs 31, 32 and 33 being part of power transmission unit 6.

In practice, the functions do not have to take part completely separately, but the functions of the driving mechanisms may somewhat overlap one another. This is possible because close to the end of the movement, the movement distance still left comes close to zero, because the transmission ratio of the pin-and-fork mechanism goes towards infinity. Thus, in both control sectors, there can be reserved, within the turning sector of gear wheel 20 of the power transmission unit, 90° for the turning movement of the door, 60° for moving the locking bolts, and 60° for carring out the functions of the pressure balancing valve. If thereby the function sectors of the door and the locking bolts overlap each other, for instance, by 15° and correspondingly, the function sectors of the locking bolts and the valve by 20°, there will still be left 5° of both control sectors to form a free area between the control sectors.

As suitable turning angles for the fork guides, 90° can be chosen for fork guides 28 of the door, 120° for fork guide 29 of the locking bolt mechanism, and 120° for fork guide 30 of valve 7.

The driving means can also be provided with certain additional characteristics, for instance, the different operation stations can be given a certain mutual priority. The turning mechanism of the door can be provided with an overload guard, which is able to mechanically switch off the functions of the turning mechanism of the door. It is also feasible to arrange, for instance, for allowing transport of bulky goods, a possibility of opening both doors at the same time. This can take part, for instance, so that after opening the "outer" door the overload guard of the turning mechanism of said door is activated with a special tool, so that the door turns freely. After this, the opposite "inner" door is opened by turning a hand wheel. Closing of the doors takes part in the opposite order.

The invention is not limited to the embodiments presented above, but several modifications of the invention are feasible within the scope of the attached claims.

I claim:

1. A closable passage arrangement interconnecting two spaces, said arrangement comprising a closure unit having two passage openings each provided with a door or the like lockable with a locking bolt mechanism, each door connecting said closure unit to a different one of said spaces and being provided with driving means for operating said door, said driving means comprising, for each door, a power transmission unit arranged to influence separately a mechanism for turning the door and a mechanism for operating said locking bolt mechanism of the door, said power transmission units of the doors being interconnected by means of a common shaft, said power transmission units including a pin-and-fork mechanism, wherein a rotatable power transmission member provided with crank pins or the like is cooperating with a number of fork members, said driving means comprising a plurality of door operating stations each including a door operating member being directly or by means of said common shaft connected to said power transmission units, said driving means including mechanical means positively guiding the functions of said driving means during opening and closing of any of said doors and means mechanically guiding said functions to take part only in one given order, said functions being obtainable from any of said door operating stations, and means connecting the operating mechanisms of the doors for mechanically locking one door during operation of the other door.

2. An arrangement according to claim 1, in which said driving means comprise, for each power transmission unit, a drive shaft for each function of the arrangement, and that said drive shafts are provided with a fork guide arranged to be influenced by one of said crank pins or the like for obtaining said function.

3. An arrangement according to claim 2, in which, for keeping said fork guides in their closed position, said rotatable power transmission member is provided with guiding discs preventing in a certain position said fork guides from moving away from their closed position.

4. An arrangement according to claim 2 or 3, in which said rotatable power transmission member is surrounded by a housing, and that for limiting the freedom of turning of said fork guides, said housing is provided with fixed stop members.

5. An arrangement according to claim 1, in which said rotatable power transmission member has a function range, within which separate successive control sections have been reserved for the operating functions of both said doors, said power transmission members and guiding means of said power transmission units being so arranged, that said operating functions to be carried out at one door of said closure unit are obtainable successively within the guiding sector reserved for said functions, when rotating said rotatable power transmission member, whereby, when going over to the guiding sector of said rotatable power transmission member reserved for the operating functions to be carried out at the other door of said closure unit, said power transmission members and guiding means of said first mentioned door are mechanically locked in their closed position.

6. An arrangement according to claim 5, in which said power transmission is mechanically so arranged that the operating functions relating to the opening of a door can only be directly followed by the functions relating to the closing of said door.

* * * * *